United States Patent [19]

Cakmakci

[11] Patent Number: 5,063,014
[45] Date of Patent: Nov. 5, 1991

[54] METHOD FOR MOLDING TRIM STRIPS BY EXTRUSION MOLDING IN AN OPEN MOLD

[75] Inventor: Mehmet Y. Cakmakci, Rochester Hills, Mich.

[73] Assignee: Aeroquip Corporation, Jackson, Mich.

[21] Appl. No.: 520,306

[22] Filed: May 7, 1990

[51] Int. Cl.⁵ ............................................. B29C 43/08
[52] U.S. Cl. ................................. 264/151; 264/161; 264/163; 264/210.2; 264/310; 264/320; 425/374
[58] Field of Search ............... 264/151, 163, 210.1, 264/284, 286, 299, 310, 320, 322, 323, 161, 210.2; 425/122, 374

[56] References Cited

U.S. PATENT DOCUMENTS

| | | | |
|---|---|---|---|
| 3,350,492 | 10/1967 | Grooteboer | 264/323 |
| 3,470,286 | 9/1969 | Weber | 264/284 |
| 3,771,938 | 11/1973 | Pinto et al. | 264/251 |
| 3,914,365 | 10/1975 | Kim et al. | 264/284 |
| 3,917,772 | 11/1975 | Hollenbeck | 264/284 |
| 4,323,533 | 4/1982 | Bramhall | 264/284 |
| 4,340,557 | 7/1982 | Gross | 264/151 |
| 4,489,019 | 12/1984 | Taheda et al. | 264/26 |
| 4,631,161 | 12/1986 | Popow | 264/310 |
| 4,719,067 | 1/1988 | Thiel | 264/139 |
| 4,722,818 | 2/1988 | Zoller | 264/171 |
| 4,971,544 | 11/1990 | Schneeberger | 264/210.1 |
| 4,976,906 | 12/1990 | Nakasone et al. | 264/163 |
| 4,981,637 | 1/1991 | Hyer | 264/151 |

FOREIGN PATENT DOCUMENTS

3608813A 9/1987 Fed. Rep. of Germany ...... 264/322

Primary Examiner—Jan H. Silbaugh
Assistant Examiner—Merrick Dixon
Attorney, Agent, or Firm—Ralph J. Skinkiss; Philip M. Rice

[57] ABSTRACT

Automotive trim strips are molded in an open-faced mold cavity by extruding a ribbon of plastic therein and moving a shaping roller thereover to compression mold the viewing surface of the trim strip into conformity with the surface of the mold cavity and to shape the non-viewing with the shaping roller.

17 Claims, 6 Drawing Sheets

METHOD FOR MOLDING TRIM STRIPS BY EXTRUSION MOLDING IN AN OPEN MOLD

BACKGROUND OF THE INVENTION

Heretofore, plastic automotive trim strips have been manufactured either by injection molding or by extrusion molding of the part desired to be affixed to the viewing surface of an automotive vehicle. As a general rule, extrusion molding is preferred as it is significantly less expensive than injection molding. However, extrusion molding has certain limitations including the fact that the side edges of the article as extruded will be straight and parallel and the ends of each cut-to-length strip will show the cross sectional interior of the extruded material unless such ends are reworked or have separately molded end caps applied.

Additionally, certain parts such as those for trim around the wheel wells have more complex shapes and are typically formed by injection molding.

A method of extrusion molding and automotive trim strip is disclosed in U.S. Pat. No. 4,722,818. Under such patent, the trim strip is made by extruding a thermoplastic material through an extrusion passageway, passing a film strip through a guide passageway in a novel die assembly and then bonding the film strip and the thermoplastic material into engagement.

U.S. Pat. No. 4,719,067 discloses a method of forming an end piece by injection molding onto a previously formed trim strip.

U.S. Pat. No. 4,489,019 discloses a method for producing longitudinal moldings with non-uniform sections without the use of an injection molding machine. Under the invention disclosed therein, one part of the molding is formed by extrusion molding and another part is remolded or reshaped to the desired cross-sectional configuration. U.S. Pat. No. 4,489,019 discloses another method for forming a molding in part by extrusion molding and in part by remolding or reshaping.

It is the object of the present invention to provide a new and noval method and apparatus for molding plastic articles.

It is a further object of the present invention to form a new and molded plastic trim strip.

It is yet another object of the present invention to provide a method and apparatus for molding plastic trim strips and other plastic articles such that shapes not attainable with extrusion molding may be molded at a cost significantly lower than the cost of injection molding a similar part.

SUMMARY OF THE INVENTION

This invention relates to a method and apparatus for forming automotive trim strips by extruding a ribbon of heated plastic material into an open-faced mold having a molding surface and compressing a rotary forming mechanism against such ribbon to force the plastic material into conformity with the molding surface while simultaneously shaping the opposite side of the trim strip with the forming mechanism and to an article formed by such method.

BRIEF DESCRIPTION OF THE DRAWINGS

These and other objects of the invention will be seen by reference to the description set forth in the accompanying drawings in which.

DETAILED DESCRIPTION OF THE INVENTION

Figure 1:
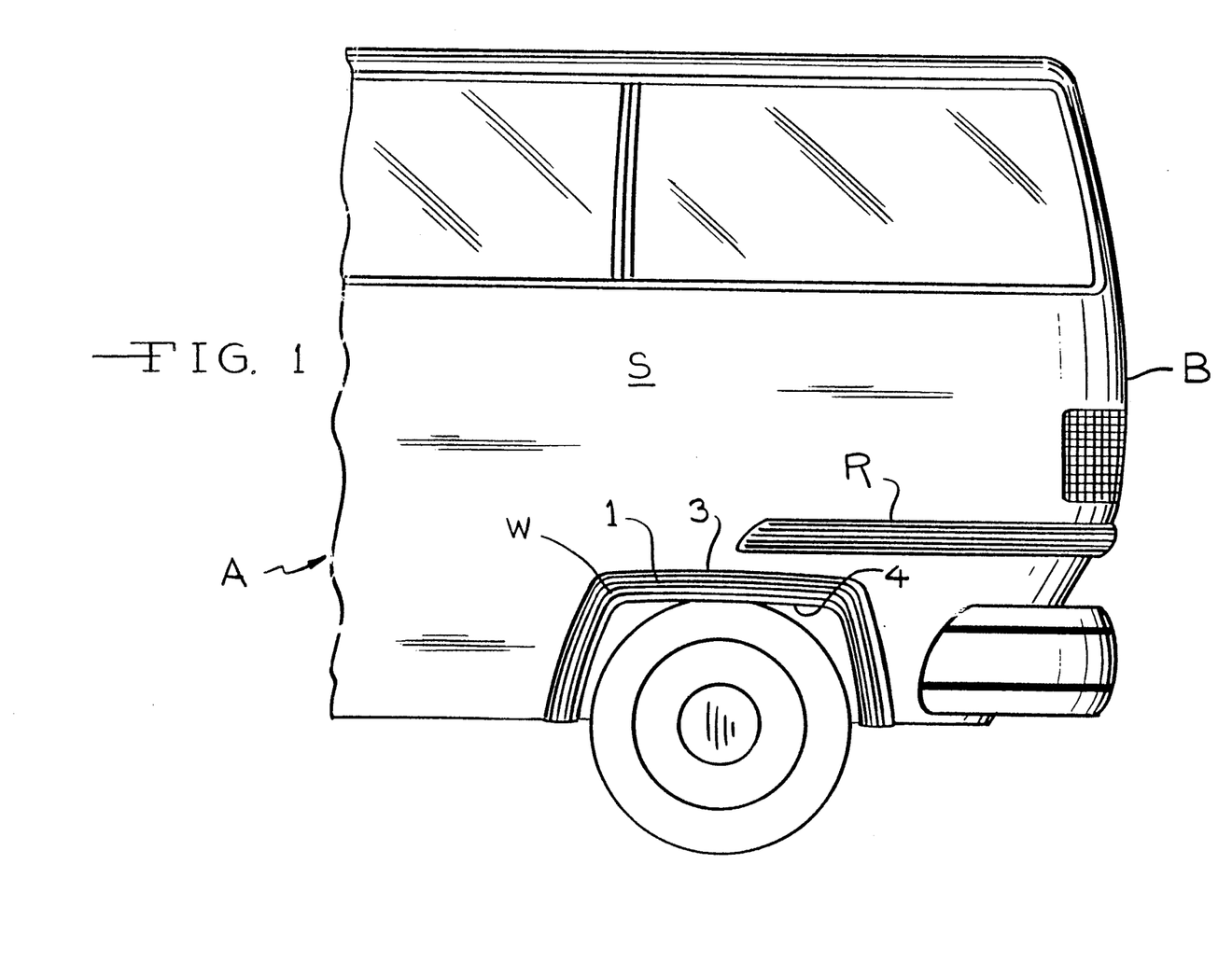
FIG. 1 shows an automotive vehicle having affixed thereto two configurations of trim strips, namely, a wheel well trim strip and a rear/side wrap around trim strip, formed according to the present invention.

Referring to FIG. 1, there is shown an automotive vehicle A having two of a wide variety of shapes of trim strips formed according to the present invention. Thus, the automotive vehicle A has a wheel well trim strip W and a rear/side trim strip R. As will be appreciated from the following description, the wheel well trim strip W as affixed to the vehicle A has substantially the same shape as it had upon removal from the mold. In contrast, the trim strip R is flat as molded but becomes curved when wrapped around the corner joining the side S and back B of the vehicle A.

Figure 5:
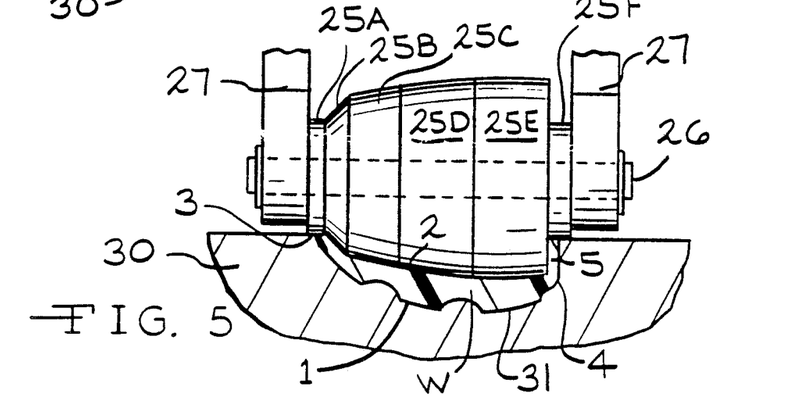
FIG. 5 is a sectional view taken through line 5—5 of FIG. 3 with the plastic material compression molded between the forming mechanism and the molding surface to form a molded wheel well trim strip.

As can be seen from FIG. 1 and also from FIG. 5, the wheel well trim strip W has a viewing surface 1, a non-viewing surface 2 intended to face the vehicle A, an upper or outer edge 3 and an inner edge 4 which includes an inwardly extending flange 5. The wheel well trim strip W, as molded, follows a curved path generally matching that of the wheel well of the vehicle A.

Referring now to FIGS. 2-5, there is shown an extruder generally designated by the numeral 10 having an hopper 11 for receiving pellets or granules of thermoplastic material such as polyvinyl chloride (PVC) or other suitable plastic, and feeding it to an elongated barrel 12 having a heater for melting the plastic material and a screw (not shown) for feeding the melted plastic material through the barrel 12. The hopper 11 and barrel 12 are supported on a support stand 13.

Secured to the end of the barrel 12 is a downwardly extending neck 15 to which is attached a die head 16 for receiving the heated and plasticized PVC or other plastic material from the barrel 12. The die head 16 includes an outlet orifice 17 from which plastic material is extruded in the form of a ribbon 18. As will be appreciated by those skilled in the art, the orifice 17 may have any one of a wide variety of shapes and configurations with the result that the ribbon 18 of plastic material as extruded may have a wide variety of cross sectional configurations.

In order to form the wheel well trim strip W having the inwardly extending flange 5, the ribbon 18 preferably has a cross-sectional configuration which includes a substantially horizontal bottom portion 19, a substantially vertical edge portion 20 which will provide plastic material for shaping the flange 5 and an upturned portion 21 approximating the shape of the outer edge 3 of the wheel well trim strip W. It should be understood, however, that the ribbon 18 may have any one of a wide variety of cross sectional configurations. It is the final shaping of the plastic material according to the method to be described that determines the final contour of the finished trim strip W, the non-viewing surface 2 as well as the viewing surface 1. Thus, although it is preferred that the ribbon 18 have a cross-sectional shape approximating the shape of the finished wheel well trim strip W, it could have other configurations so long as there is a sufficient amount of plastic material to form all portions of the trim strip W.

In close proximity to the extrusion die head 16 is a shaping roller mechanism generally designated by the numeral 25 rotationally supported on an axle 26 supported at each end by a pair of downwardly extending arms 27 fastened to an outwardly extending support arm 28. The support arm 28 may be rigidly connected to a rotatable shaft 22 extending from a gear box 29. A motor 24 powers the gear box 29 to rotate the shaft 22 slightly in a clockwise direction when it is desired to raise the shaping roller mechanism 25 and in a counterclockwise direction when it is desired to lower it. Other types of support means may be utilized for supporting the shaping roller mechanism 25; however, as will become clear from a description of the molding operation, it is preferred that the shaping roller mechanism 25 be yieldingly urged downwardly.

Positioned beneath the die head 16 is a mold 30 having an open faced mold cavity 31 conforming to the desired exterior or viewing surface 1 of the trim strip W. The mold cavity 31 follows a curved path from one end 31A to the other end 31B having generally the contour of the wheel well of the vehicle A.

Figure 2:
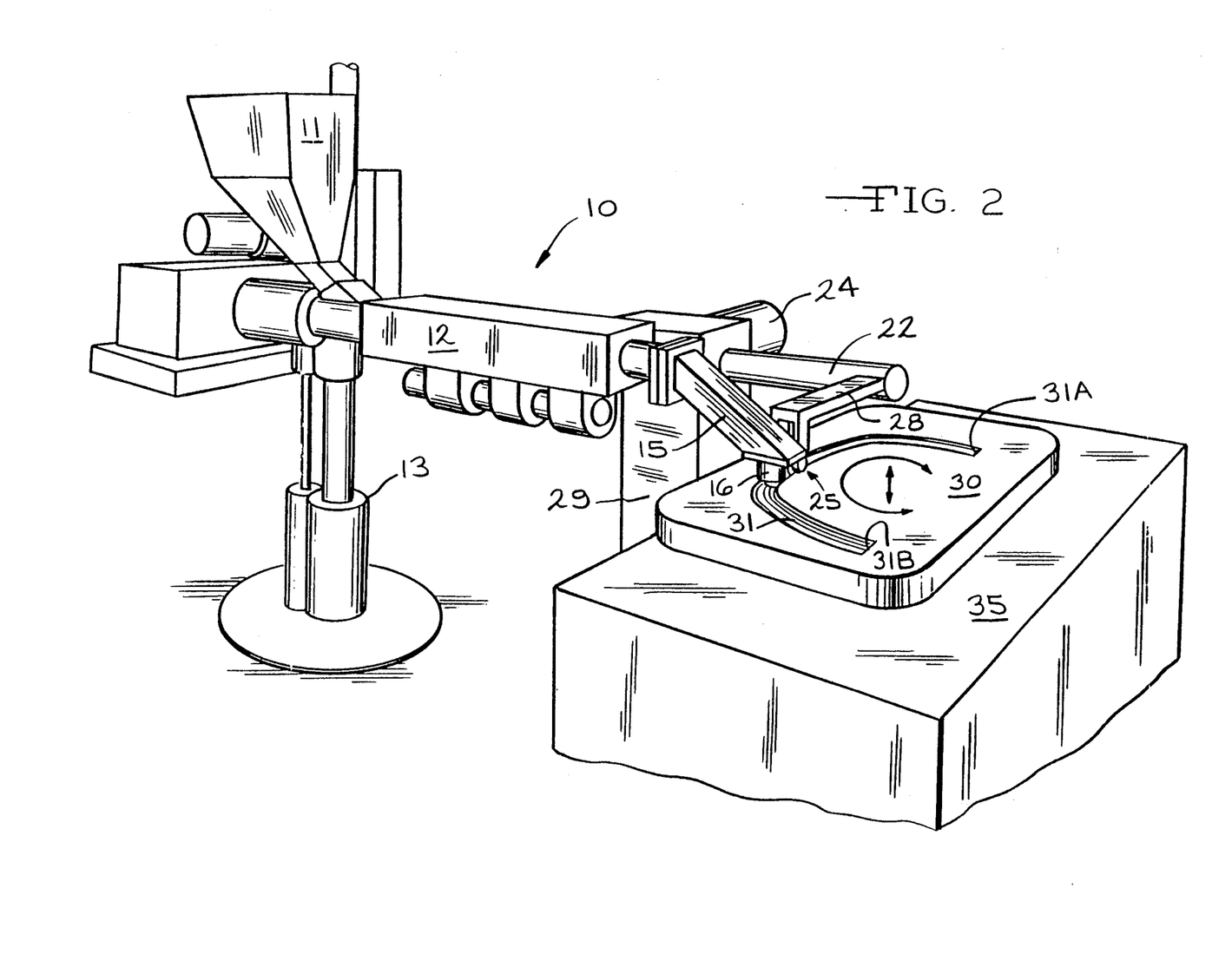
FIG. 2 is a perspective view showing schematically apparatus for molding an automotive trim strip or other article having a curved configuration and showing specifically the mold for forming the wheel well trim strip shown in FIG. 1.
Figure 3:
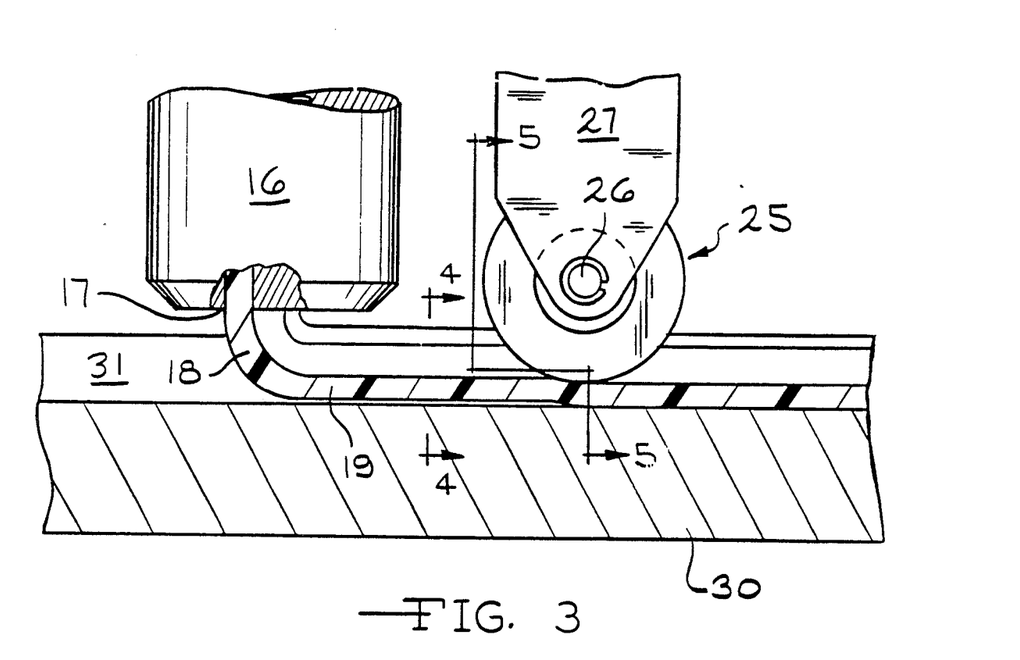
FIG. 3 is a view, partially in the section, showing a portion of the molding apparatus of FIG. 2.

The mold 30 is mounted on a table 35 having a mechanism (not shown) for moving the mold 30 rotationally and/or eccentrically and/or in a straight line path depending upon the specific end to end configuration of the mold cavity 31. Thus, the mold 30 is moved beneath the orifice 17 of the die head 16 so that the mold cavity 31 is positioned directly thereunder to receive the ribbon 18, starting with the one end 31A and then throughout the remainder of the mold cavity 31 to the opposite end 31B. Obviously, if the mold cavity 31 from end to end is in the shape of an arc of a circle, the mold 30 will be required to move only in a circular path beneath the die head 16. If the end to end configuration of the mold cavity 31 is other than an arc of a circle, it will be necessary to provide a suitable cam mechanism to control the path followed by the mold beneath the die head 16 to insure that the mold cavity 31 is positioned beneath the orifice 17 throughout the complete extrusion phase of the molding operation. The use of cams to determine movement of a body mold or other is not new and does not form a part of the present invention.

It is within the scope of the present invention that the mold be fixed and the die head 16 be movable in order to extrude the ribbon 18 throughout the length of the cavity 31.

Figure 4:
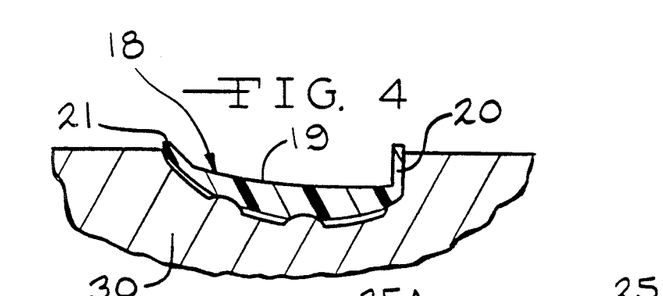
FIG. 4 is a sectional view taken through line 4—4 of FIG. 3 showing a ribbon of plastic extruded into the mold cavity but not yet molded.

Referring now to FIGS. 3-5, immediately after the ribbon 18 of heated and moldable PVC or other plastic material is deposited in the mold cavity 31, the shaping roller 25 passes thereover to compress the still hot moldable plastic material firmly into the mold cavity 31. Obviously, if the trim strip being molded has a flat or planar non-viewing surface, the roller 25 could have a simple cylindrical shape. However, in this embodiment of the present invention, since the wheel well trim strip W has a cross-sectional configuration in which the non-viewing or attaching surface 2 is contoured rather than flat, the shaping roller mechanism 25 must be contoured. Thus, as may be seen in FIG. 5, the shaping roller mechanism 25 is formed with separate roller segments 25A, 25B, 25C, 25D, 25E and 25F which are independently mounted on the axle 26. Each of such roller segments has a different shape or contour and each abuts the adjacent segment so that as the roller mechanism 25 is rotated against to the extruded ribbon 18, it shapes the plastic material into conformity with the mold cavity 31 to form the viewing surface 1 and into conformity with the exterior surfaces of the respective roller segments 25A, 25B, 25C, 25D, 25E and 25F to form the non-viewing surface 2. As can be seen, the flange 5 is formed between the side of roller segment 25E and the opposing surface of the mold cavity 31 with the free end of the flange 5 formed by the roller segment 25F. The upper or outer edge 3 is formed by the roller segment 25A. As can also be seen in FIG. 5, the outer roller segments 25A and 25F, in addition to shaping the outer edge 3 and free end of the flange 5, respectively, also ride across the upper surface of the mold 30. This coupled with the downward urging of the shaping roller mechanism insures that the non-viewing surface 2 is molded to the designed contour.

In operation, the mold 30 is initially positioned with the mold cavity end 31A lying directly under the die head 16 and the shaping roller mechanism 25 positioned beyond the end 31A and resting upon the face of the mold 30. As previously described, the roller mechanism 25 is preferably yieldingly urged downwardly and may ride up on the surface of the mold 31 when positioned beyond the end 31A of cavity 31. Immediately upon extrusion of the initial portion of the ribbon into the mold cavity of 31, the mold 30 is caused to move rotationally or in other appropriate direction so that the ribbon 18 is deposited into the mold cavity throughout the full length thereof to the opposite end of 31B. The ribbon 18 of thermoplastic material is shaped by the roller mechanism 25 passing over the newly deposited ribbon 18 throughout the full length of the mold cavity of 31.

FIGS. 6-9 show apparatus for molding an article such as the rear/side trim strip R which is intended to be molded flat but bent around a corner when applied to the vehicle A.

As will be appreciated by those skilled in the art and as can be seen in FIG. 1, the surface to which rear/side trim strip R is to attached follows a curved path extending from the back B to the side S around the corner. Additionally, as can be seen in FIG. 1, the back of the vehicle A is disposed at an angle or taper in the area to which the trim strip R is to be attached. A trim strip such as the trim strip R when wrapped around the back to the side of a vehicle will follow a curved path through a bend of approximately ninety degrees. If those portions of the surface of the vehicle A to which the trim strip R is to be attached defined a shape in which all such portions from top to bottom were parallel to a vertical axis, it would be possible to simply form a straight, elongated trim strip and wrap it around the corner of a vehicle from one side to the rear. This could be readily accomplished on that type of surface even though the trim strip was straight as molded and fairly wide, for example, 2-4 inches. However, those portions of automotive vehicles to which trim strips are attached usually do not follow a path in which all portions are parallel to a vertical axis. Rather, they more frequently follow an path such as that shown in FIG. 1 in which that portion of the back B to which the rear/side trim strip R is attached bends or curves inwardly toward the center of the vehicle A, from top to bottom of the trim strip R. Desirably, the trim strip R, when affixed to the vehicle A, will be horizontal or parallel to the bottom. As will be appreciated, in order for the trim strip R to snugly match the attached surface of vehicle A, when wrapped around the corner of a vehicle A having such contour, the upper edge of such trim strip R must be longer than the lower edge. This is accomplished by molding the trim strip R to follow a curved path such as that shown in FIG. 6.

As can be seen in FIGS. 6-9, the trim strip R may have a substantially planar non-viewing surface 101 and a contoured viewing surface 102. As in the previous embodiment, an extruder 10 and shaping roller mechanism 125 are positioned above a mold 130. The mold 130 has an open-faced cavity 131 which follows a straight path at each end with a curved path in the center joining the ends. Thus, the mold cavity extends from one end 131A, along a straight path to a curved section 131C, and then along a straight path in a different direction to the opposite end 131B. If desired, the molding surface of the mold cavity 131 may be contoured as at 132. The mold 130 has a short knife 133 encircling the mold cavity 131. (See FIGS. 8 and 9). The knife 133 extends upwardly from the face of the mold approximately 0.015 inches and terminates in a cutting edge 134. The knife 133 severs excess plastic material introduced into the mold cavity 131 from the die head 16. Thus, although it is possible to obtain commercially satisfactory parts by extruding into the mold cavity 131 the precise amount of plastic material necessary to form the trim strip R, controlling the flow of the ribbon 18' of plastic material into the mold cavity 131 to such a precise degree on a production basis can be difficult. Accordingly, it has been found that consistently superior results can be obtained by extruding a greater amount of plastic into the mold cavity 131 than is necessary to form the finished trim strip R. Such excess will be squeezed out of the mold cavity in the form of flash 136 which must be removed to form the finished trim strip R. Although the flash 136 could be removed in a separate trimming operation, the use of a mold having a knife 133 will permit the trimming to be done during the shaping operation as will become clear from the following description.

Figure 6:
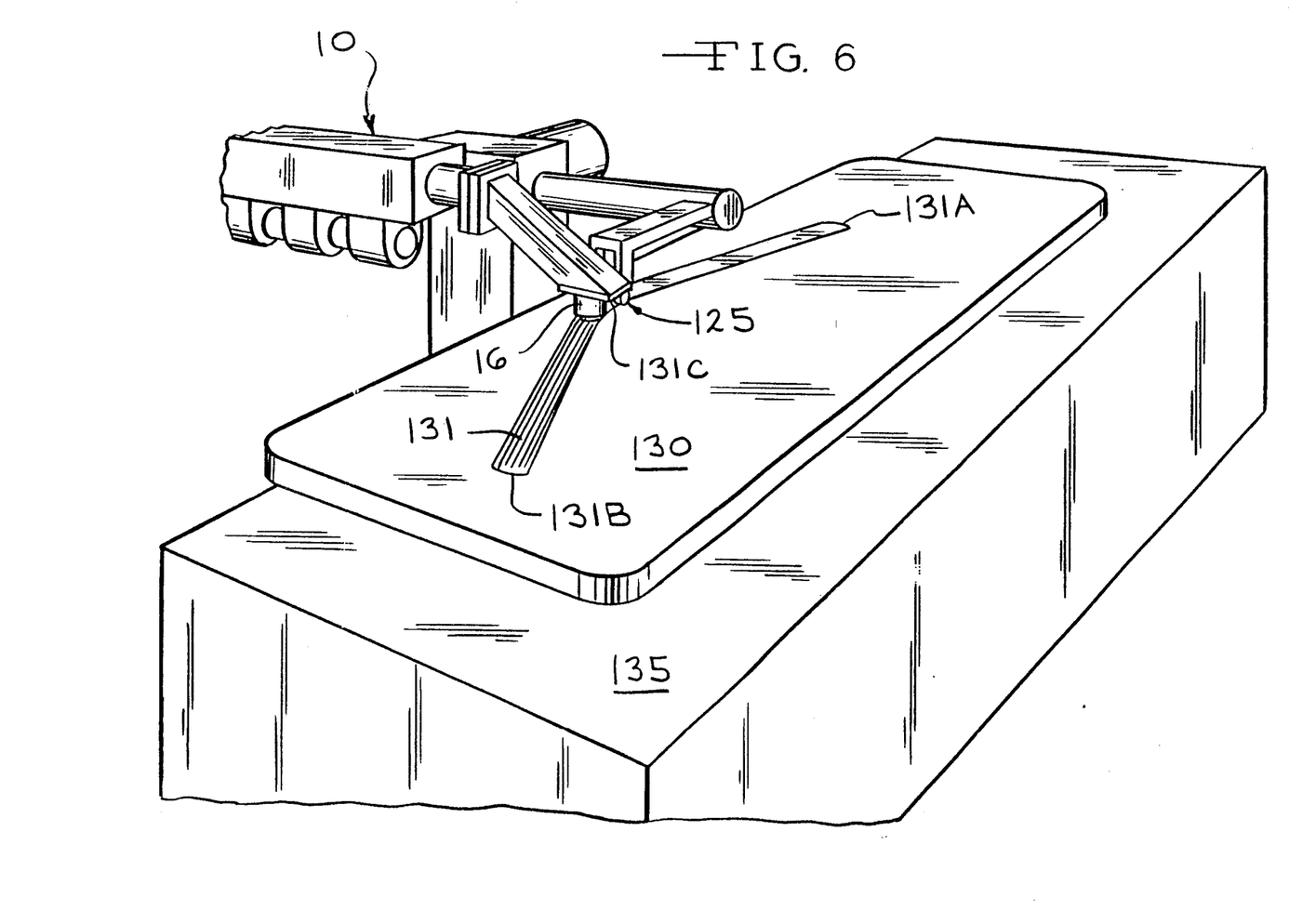
FIG. 6 is a partial perspective view showing schematically apparatus including the mold for forming the rear/side trim strip shown in FIG. 1.
Figure 7:
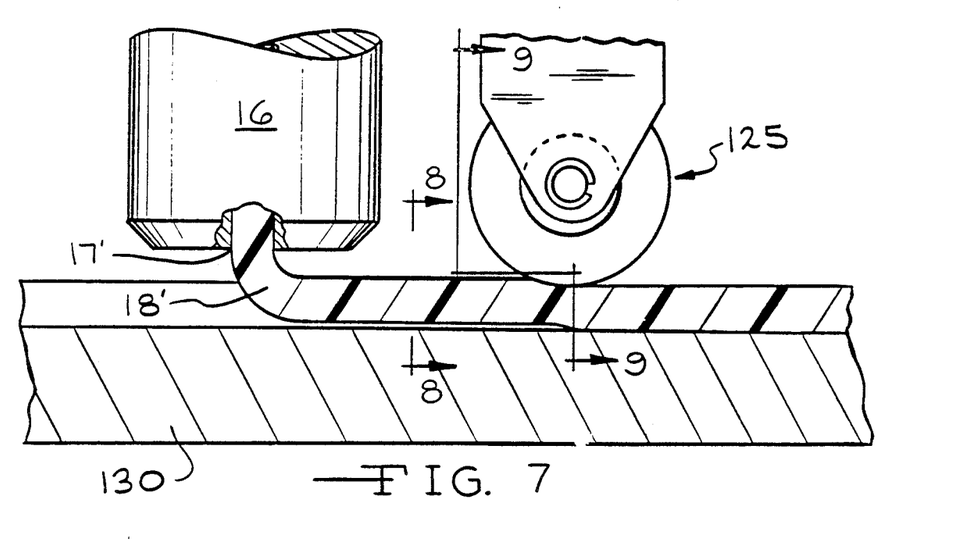
FIG. 7 is a view, partially in section, showing a portion of the molding apparatus of FIG. 6.

The mold 130 is mounted on a table 135 having a mechanism (not shown) for moving the mold 130 initially in a straight line path then in a curved path following the path of the curved section 131C and finally in a straight line path. Thus, the mold 130 is moved beneath the orifice 17' of the die head 16 so that the mold cavity 131 is positioned directly thereunder to receive the PVC or other plastic material starting with the one end 131A and then throughout the remainder of the mold cavity 131 to the opposite end 131B.

Since the non-viewing surface 101 of the trim strip R molded pursuant to this embodiment has a planar configuration, the die head 16 may have an orifice 17' shaped to extrude a ribbon 18' having a generally rectangular configuration.

Figures 8, 9:
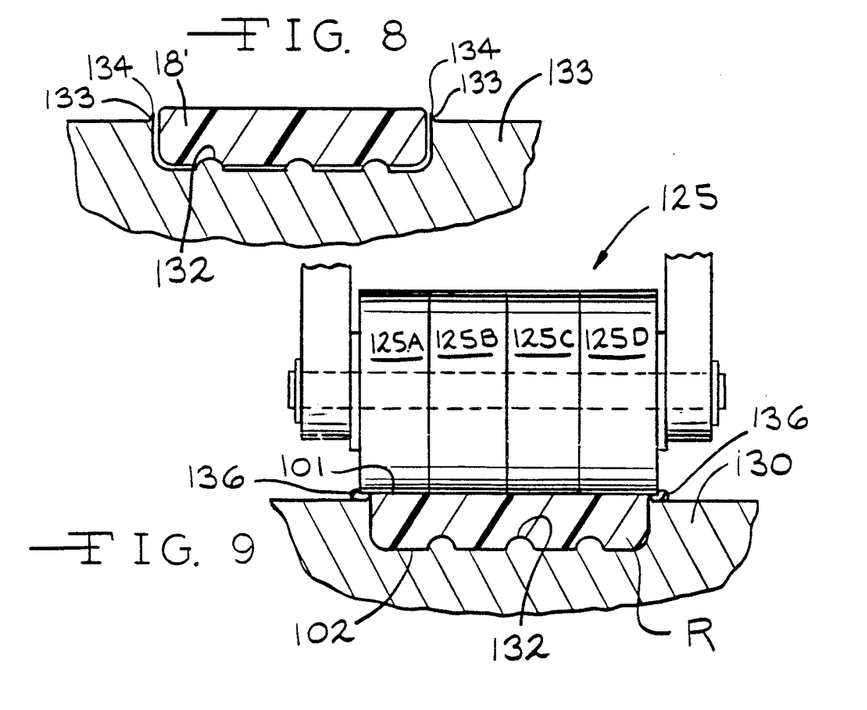
FIG. 8 is a sectional view taken through line 8—8 of FIG. 7.
FIG. 9 is a sectional view taken through line 9—9 of FIG. 8.

Additionally, as can be seen in FIG. 9, there is provided a shaping roller mechanism 125 having a cylindrical configuration. Since the mold 130 will follow a curved path as the mold cavity curved section 131C passes beneath the shaping roller mechanism 125, it is desirable that the shaping roller mechanism 125 have independently rotatable roller segments 125A, 125B, 125C and 125D. The outer roller segments 125A and 125D extend beyond the opposite sides of the mold cavity 131 and engage the cutting edge 134 of the knife 133.

In operation, the mold 130 is initially positioned with the mold cavity end 131A beneath the extrusion die head 16 and with the roller mechanism 125 contacting the face of the mold beyond the end 131A of the mold cavity 131. A ribbon 18' of plastic material is extruded from the orifice 17' and deposited throughout the length of the mold cavity 131 as the mold 130 moves beneath the die head 16. Preferably, the amount of plastic material deposited in the cavity 131 will be slightly in excess of that needed to form the trim strip R. Immediately after the ribbon 18' of heated and moldable PVC or other plastic material is deposited in the mold cavity 131, the shaping roller 125 passes thereover to compress the still hot moldable plastic material firmly into the mold cavity 131. The excess plastic material will be squeezed out of the mold cavity 131 to form flash 136. Those roller segments overlying the cutting edge 134, namely, segments 125A and 125D in FIG. 9, will engage the cutting edge 134 to trim the flash 136 from the finished trim strip R. As the shaping roller mechanism 125 contacts the ends 131A and 131B, respectively, the intermediate segments 125B and 125C will engage the cutting edge 134 and trim the flash in those areas.

Figures 10, 11:
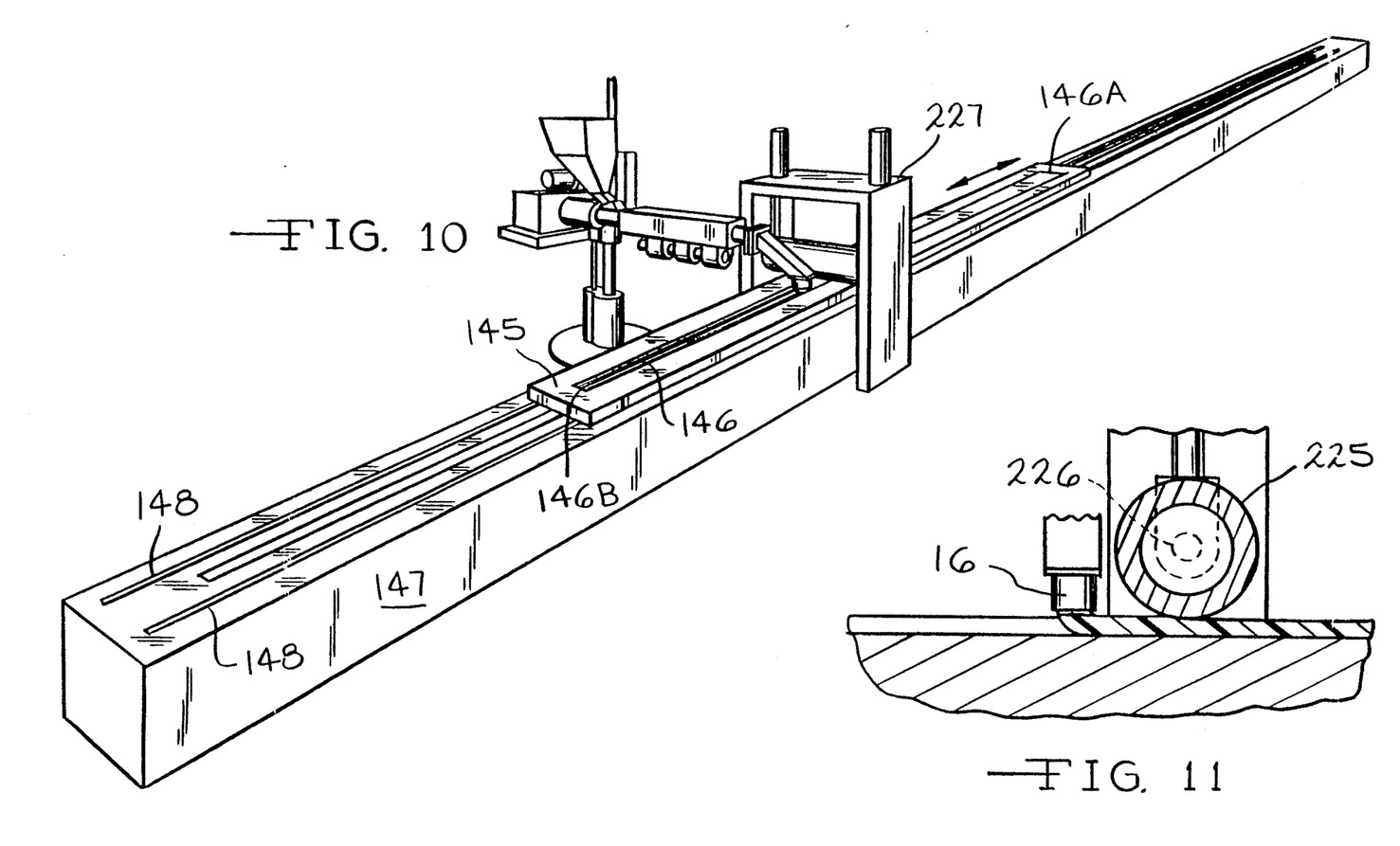
FIG. 10 is a perspective view of apparatus for forming a tapered trim strip according to the present invention.
FIG. 11 is a view, partially in section, showing a portion of the molding apparatus of FIG. 10.

Referring now to FIGS. 10 and 11, there is shown a modified embodiment for producing a trim strip which is straight but which is tapered. In this embodiment, there is provided an elongated mold 145 having a mold cavity 146 extending from a first end 146A of a given width to an opposite end 146B which is substantially narrower. The mold 145 is mounted on a table 147 having a pair of guide channels 148. The mold 145 may be moved from a position at which the end 146A underlies the die head 16 to a position at which the opposite end 146B underlies the die head 16.

In this embodiment a cylindrical roller 225 is mounted on an axle 226 supported in a support mechanism 227. As will be appreciated, the operation of this embodiment is substantially the same as the previous embodiment in that the roller 225 urges the heated and moldable plastic material firmly into the mold cavity 146 to form the finished article.

Many modifications will become readily apparent to those skilled in the art. For example, the embodiments shown in FIGS. 3-5, 10, and 11 could also utilize a mold having a knife partially or completely encircling the mold cavity in order to trim any flash. Accordingly, the scope of this invention should be determined by the scope of the appended claims.

I claim:

1. A method for molding a plastic article extending from a leading end to a trailing end and having an inner surface and an outer surface and a pair of edges joining said inner and outer surfaces comprising the steps of:

extruding a ribbon of heated and moldable plastic material into an open-faced mold cavity extending from a first end defining said leading end to a second end defining said trailing end, said mold cavity having a molding surface defining the desired configuration of a portion of the finished article, the quantity of plastic material extruded into said cavity exceeding the quantity of plastic material in the finished article;

contacting said ribbon sequentially from said leading end to said trailing end while in heated moldable condition with a shaping element to force said ribbon into conformity with said molding surface and excess plastic material outwardly beyond the periphery of said molding cavity while simultaneously shaping portions of said ribbon out of contact with said molding surface and trimming said excess during said contacting step.

2. A method for molding a decorative plastic strip extending from a leading end to a trailing end and having an inner surface and an outer surface and a pair of edges joining said inner and outer surfaces comprising the steps of:

extruding a ribbon of heated and moldable plastic material into an open-faced mold cavity extending from a first end defining said leading end to a second end defining said trailing end, said mold cavity having a molding surface defining the desired configuration of said outer surface, said edges and said leading and trailing ends of the finished strip;

contacting said ribbon while in heated moldable condition with a shaping element;

imparting relative movement between said shaping element and said mold to sequentially compress incremental segments of said ribbon into conformity with said molding surface from said first end to said second end while shaping opposing portions of said incremental segments with said shaping element.

3. The method according to claim 2, wherein the quantity of plastic material extruded into said mold cavity exceeds the quantity of plastic material in the finished decorative plastic strip and further including the steps of forcing excess plastic material outwardly beyond the periphery of said molding cavity and trimming said excess during the steps of contacting said ribbon and imparting relative movement.

4. The method according to claim 2 wherein said shaping element is rotatable and the step of imparting movement causes the shaping element to rotate across and shape those portions of the surface of said ribbon out of contact with said molding surface.

5. The method according to claim 4, wherein the quantity of plastic material extruded into said mold cavity exceeds the quantity of plastic material in the finished decorative plastic strip and further including the steps of forcing excess plastic material outwardly beyond the periphery of said molding cavity and trimming said excess during the steps of rotating said rotatable shaping element against said ribbon and imparting relative movement.

6. A method for molding a decorative plastic strip extending from a leading end to a trailing end and having an inner surface and an outer surface and a pair of edges joining said inner and outer surfaces comprising the steps of:

providing a mold having a generally horizontal face with a cavity formed therein extending from a first end defining said leading end to a second end defining said trailing end, said mold cavity having a molding surface conforming to the desired configuration of said outer surface, said edges and said leading and trailing ends of the finished strip, said cavity being open at said face;

extruding a ribbon of heated and moldable plastic material into said cavity;

contacting said ribbon while in heated moldable condition with a shaping element;

imparting relative movement between said shaping element and said mold to sequentially compress incremental segments of said ribbon into conformity with said molding surface from said first end to said second end and sequentially shaping opposing portions of said incremental segments contacted by said shaping element.

7. The method according to claim 6, wherein the quantity of plastic material extruded into said mold cavity exceeds the quantity of plastic material in the finished decorative plastic strip and further including the steps of forcing excess plastic material outwardly beyond the periphery of said molding cavity and trimming said excess during the steps of contacting said ribbon and imparting relative movement.

8. The method according to claim 6, wherein said shaping element is rotatable and the step of imparting relative movement causes the shaping element to rotate across and shape those portions of the surface of said ribbon out of contact with said molding surface.

9. The method according to claim 8, wherein the relative movement between said shaping element and said mold cavity includes a curved path.

10. The method according to claim 8, wherein said rotatable shaping element has a plurality of sections and the step of imparting relative movement causes different ones of said sections to rotate in varying amounts when said relative movement follows a curved path.

11. The method according to claim 8, wherein the quantity of plastic material extruded into said mold cavity exceeds the quantity of plastic material in the finished decorative plastic strip and further including the steps of forcing excess plastic material outwardly beyond the periphery of said molding cavity and trimming said excess during the steps of contacting said ribbon and imparting relative movement.

12. A method of molding in a mold, plastic trim strips extending from a leading end to a trailing end and having a viewing surface and a non-viewing surface, a pair of spaced apart edges joining said viewing and non-viewing surfaces, said edges following parallel curved paths, said mold having an elongated open-faced mold cavity, said mold having a guide surface at least partially encircling said cavity, said guide surface defining opposed edges of said cavity, said cavity having a molding surface conforming to the desired configuration of (1) said viewing surface, (2) said edges and (3) said ends, comprising the steps of extruding a ribbon of moldable plastic material from an extrusion die head into said mold cavity, imparting relative movement between said die head and said mold cavity, engaging a portion of said plastic material and said guide surface opposed edges with a rotatable shaping element, imparting relative movement between said rotatable shaping element and said guide surface following a curved path to compress sequential portions of said plastic material into conformity with said molding surface throughout the length of said mold cavity to form said viewing surface, said edges and said ends while forming said non-viewing surface with said rotatable shaping element.

13. The method according to claim 12, wherein the step of forming said non-viewing surface includes shaping said non-viewing surface to a non-planar contour.

14. The method according to claim 12, wherein said guide surface terminates in an upwardly extending cutting edge and wherein the quantity of plastic material extruded into said mold cavity exceeds the quantity of plastic material in the finished trim strip and further including the steps of forcing excess plastic material outwardly beyond said cutting edge and moving said shaping element across said cutting edge to trim said excess.

15. The method according to claim 12, wherein said rotatable shaping element has a plurality of sections and the step of imparting relative movement causes different ones of said sections to rotate in varying amounts when said relative movement follows a curved path.

16. The method according to claim 12, wherein the step of forming said non-viewing surface includes shaping said non-viewing surface to a non-planar contour.

17. The method according to claim 12, wherein said guide surface terminates in an upwardly extending cutting edge and wherein the quantity of plastic material extruded into said mold cavity exceeds the quantity of plastic material in the finished trim strip and further including the steps of forcing excess plastic material outwardly beyond said cutting edge and moving said shaping element across said cutting edge to trim said excess.

* * * * *